Aug. 12, 1924.

R. W. MOSES 1,504,574

SHEAR AND PILER

Filed June 28, 1922     2 Sheets-Sheet 1

INVENTOR

Aug. 12, 1924.

R. W. MOSES

SHEAR AND PILER

Filed June 28, 1922  2 Sheets-Sheet 2

1,504,574

INVENTOR
Richard W. Moses

Patented Aug. 12, 1924.

1,504,574

UNITED STATES PATENT OFFICE.

RICHARD W. MOSES, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

SHEAR AND PILER.

Application filed June 28, 1922. Serial No. 571,492.

*To all whom it may concern:*

Be it known that I, RICHARD W. MOSES, a citizen of the United States, and residing at Pittsburgh, in the county of Allegheny and State of Pennsylvania, have invented a new and useful Improvement in Shears and Pilers, of which the following is a full, clear, and exact description.

The present invention relates to the metal working art, and more particularly to shears and pilers.

An objection to shears and pilers as heretofore constructed is that the shear housing prevents the piler being placed sufficiently close to the shear blades to render the operation of the piler entirely satisfactory. By the present invention, there is provided a combined shear and piler, in which the portion of the shear housing below the horizontal plane in which the cutting edge of the lower shear blade lies, is positioned substantially wholly at one side of the vertical plane in which said cutting edge lies, thereby permitting the piler to be placed closely adjacent to the shear blades. There is also provided a vertically movable support for the piler and a roll table, said support being arranged to raise the piler into a position to receive the sheared material and to gradually lower it as the pack of material thereon increases in height and, when sufficient material has been piled thereon, to lower it upon the roll table to be moved thereby to some other part of the mill.

My invention will be better understood by reference to the following description taken in connection with the accompanying drawings, in which,—

Figure 1:
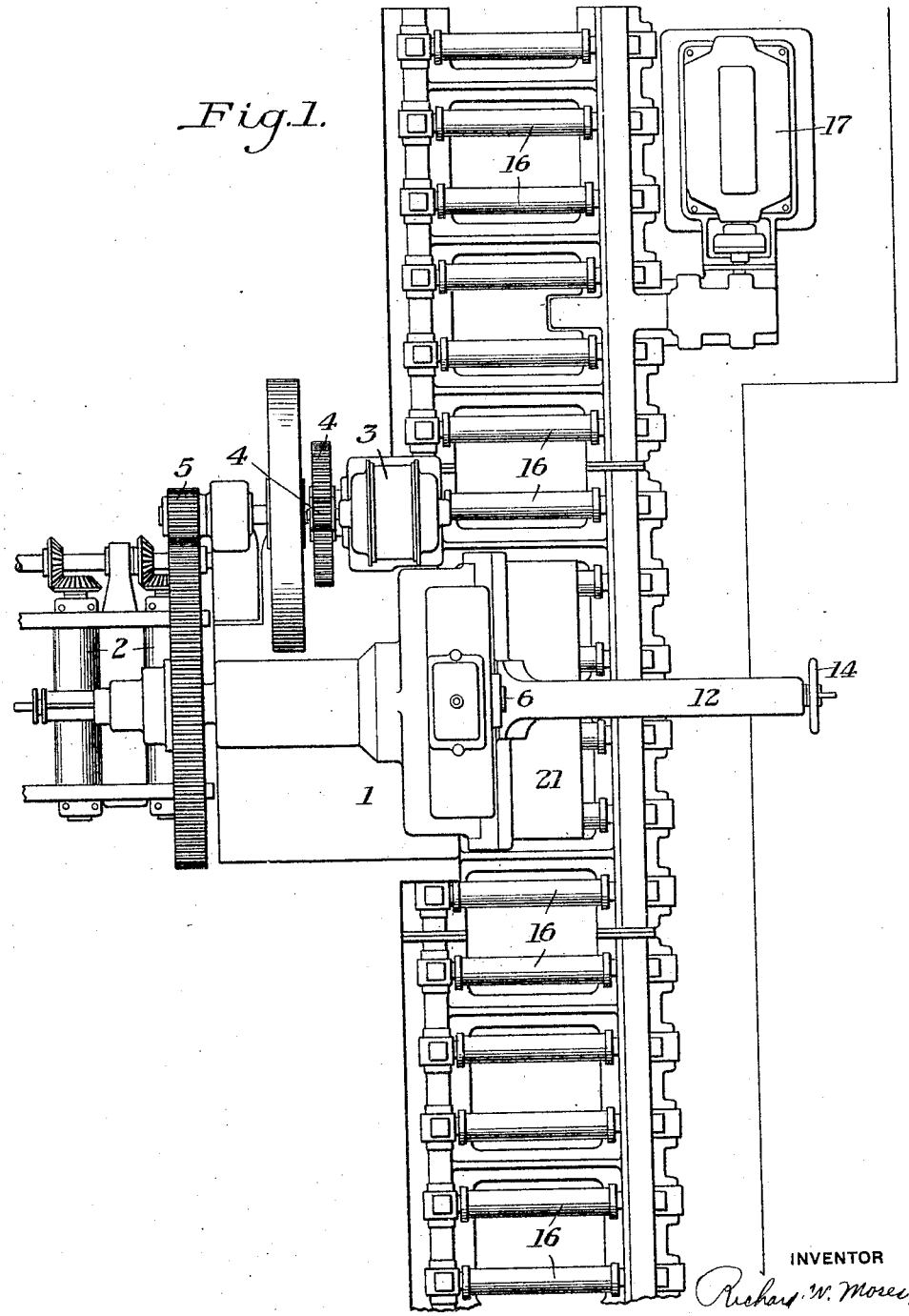
Figure 1 is a plan view of an arrangement embodying my invention.
Figure 2:
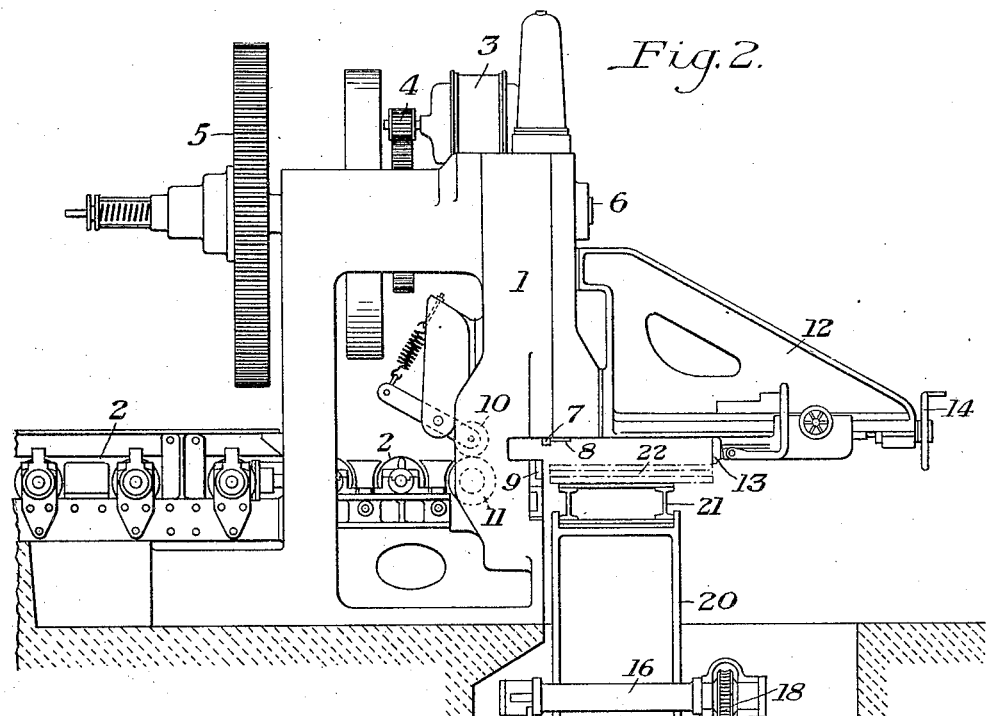
Figure 2 is a side elevation thereof.
Figure 3:
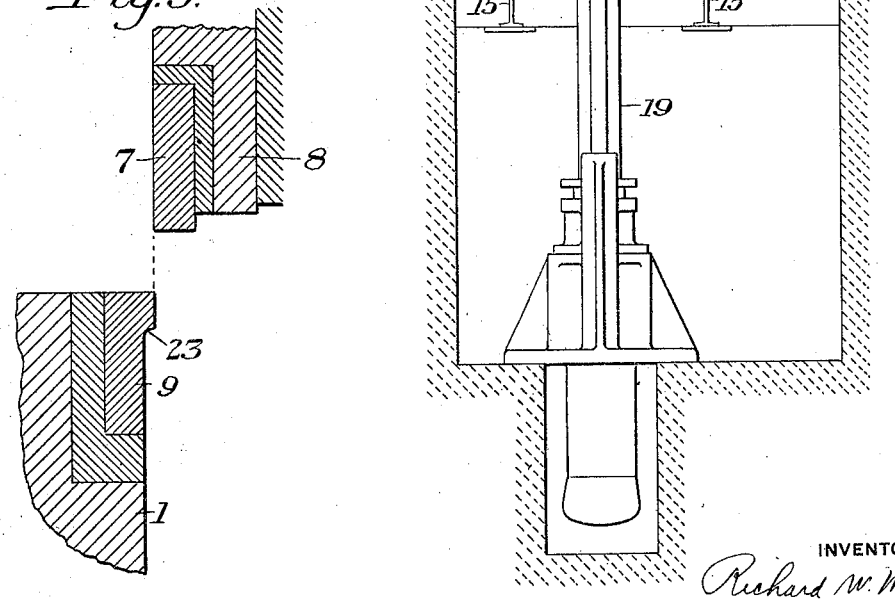
Figure 3 is a detail view of the shear blades.

Referring to the drawings, there is shown a shear having a housing 1 arranged to straddle a roll table 2 for feeding the work to the shear. The housing 1 supports a motor 3, which actuates through gearing 4 and 5 the main driving shaft 6. The upper shear blade 7 is mounted in a reciprocable head 8, which is actuated through the main shaft 6 in the usual manner. The lower shear blade 9 is supported by the housing 1 and it will be noted, by reference to Fig. 2, that the part of the shear housing which is below the horizontal plane in which the cutting edge of the lower blade lies, is positioned substantially wholly at one side of the vertical plane in which said cutting edge lies. A pinch roll 10 is arranged to cooperate with the end roll 11 of the roll table 2, so as to insure proper feeding of the material even when it has been sheared until there remains only a short length of the material.

A support 12 projects from the housing 1, overhangs the shear blades and carries an adjustable gauge block 13. The gauge block 13 is adapted to be adjusted by a handwheel 14. The position of the gauge block determines the lengths of the pieces cut by the shear blades.

Mounted below the shear blades are beams 15 upon which is supported a roll table 16 extending at right angles to the roll table 2, the rolls of which may be driven by any suitable means, such as a motor 17 and gearing 18. A piston 19, which may be operated by fluid pressure, is provided for raising and lowering a supporting frame 20, which extends upwardly between rolls of the table 16. Removably supported upon the upper end of the support 20 is a piler 21, upon which the cut lengths of material 22 fall as they are cut from the lengths coming into the shear over the feed table 2. As the pack of sheared material increases in height, the support 20 is lowered so that the upper sheared piece on the piler is always below the cutting edge of the lower shear blade. When a sufficient number of lengths have been cut and piled on the piler 21, the support 20 is lowered until the piler rests upon the rolls of the table 16. These rolls are in constant rotation and as soon as the piler rests upon them, the said piler with the pack thereon is moved in one direction or the other, depending upon the direction of rotation of the rolls. When this pack is moved out of the way, another piler 21 may be placed on the support 20 and elevated to the proper position for receiving a pack of sheared lengths. The construction is such as to permit the shear to be operated substantially continuously.

In order that there should be no binding of the sheared lengths between the gauge block 13 and the lower shear blade 9, the shear blade is cut-away at 23 so that when the upper shear blade is moved downwardly it shears the length and pushes the end of the sheared piece down to the cut-away portion 23, whereupon the sheared length freely drops onto the piler 21.

The advantages of the present invention arise from the provision of a shear having that portion of its supporting housing which is below the horizontal plane in which the cutting edge of the lower shear blade lies, positioned substantially wholly at one side of the vertical plane in which said edge lies, in combination with a piler removably supported adjacent the shear blades by means adapted to raise it into a position to receive a pack of sheared material, and then to lower it upon a conveyor for moving it to another part of the mill.

While I have shown one embodiment of my invention, I desire it to be understood that I am not to be limited to the exact arrangement shown and described, as many changes may be made in the details without departing from the spirit of my invention.

I claim:

1. The combination with a shear having upper and lower shear blades, and means for relatively actuating said blades, of means positioned at one side of said blades for receiving the sheared material, and a conveyor adjacent said means for effecting removal of the material received thereby, substantially as described.

2. The combination with a shear having a supporting housing, upper and lower shear blades, and means for relatively actuating said blades, said housing having the portion thereof which is below the horizontal plane in which the cutting edge of the lower blade lies positioned substantially wholly at one side of the vertical plane in which said cutting edge lies, of a piler, and means for removably supporting said piler adjacent said lower blade, substantially as described.

3. The combination with a shear having a supporting housing, upper and lower shear blades, and means for relatively actuating said blades, said housing having the portion thereof which is below the horizontal plane in which the cutting edge of the lower blade lies positioned substantially wholly at one side of the vertical plane in which said cutting edge lies, of a piler, and means for removably supporting said piler, said means being adapted to raise said piler into a position to receive sheared material and to gradually lower it as the material is piled thereon, substantially as described.

4. The combination with a shear having a supporting housing, upper and lower shear blades, and means for relatively actuating said blades, said housing having the portion thereof which is below the horizontal plane in which the cutting edge of the lower blade lies positioned substantially wholly at one side of the vertical plane in which said cutting edge lies, of a piler, means for removably supporting said piler, and means for receiving said piler from said supporting means and conveying it to a desired point, said supporting means being adapted to move said piler into a position adjacent said lower blade to receive a pack of sheared material and then to place it upon said conveying means, substantially as described.

5. The combination with a shear having relatively movable shear blades, of means positioned on one side of said blades for feeding material to be sheared thereto, a piler, means for removably supporting said piler on the opposite side of said blades, and means adjacent said supporting means for conveying said piler with a pack thereon to a desired point, substantially as described.

6. The combination with a shear having relatively movable shear blades, of a piler, and means for supporting said piler, said means being adapted to raise said piler into a position adjacent said blades for receiving sheared material therefrom and to lower said piler as the material is piled thereon, substantially as described.

7. The combination with a shear having relatively movable shear blades, of a piler, supporting means for said piler, and conveying means adjacent said supporting means, said supporting means being adapted to move said piler into a position adjacent said blades for receiving a pack of sheared material and then to place said piler upon said conveying means, substantially as described.

8. In a shear, upper and lower vertical blades, means for relatively moving said blades, and a gauge on one side of said blades for determining the lengths of the pieces cut by the blades, said lower blade having its lower portion cut away on the side facing the gauge to prevent binding of the cut lengths between the gauge and said blade, substantially as described.

9. The combination with a shear having relatively movable shear blades, of a roll table positioned on one side of and below said blades, a piler, and a support for said piler movable between rolls of said table and adapted to raise said piler into a position to receive a pack of sheared material from said blades and to lower said piler with the pack thereon upon said roll table, substantially as described.

10. In a shear mechanism, the combination of a housing having a passage through which the material to be cut is passed, means for feeding the material through said passage, sheer blades across said passage for cutting the material, a piler adjacent said blades and a roll table for removing the piled material, substantially as described.

11. In a shear mechanism, the combination of a housing having a passage through which the material to be cut is passed, a feed table for passing the material through said passage, shear blades across said passage for cutting the material, a piler adjacent said blades and a roll table for removing the piled material, said roll table extending at right angles to said feed table, substantially as described.

12. In a shear mechanism, the combination of a housing having a passage through which the material to be cut is passed, a feed table for passing the material through said passage, shear blades across said passage for cutting the material, a piler adjacent said blades, a roll table for removing the piled material, and a gauge on the side of the blades opposite the feed table, substantially as described.

13. In a shear mechanism, the combination of a housing having a passage through which the material to be cut is passed, a feed table for passing the material through said passage, shear blades across said passage for cutting the material, a piler adjacent said blades, a roll table for removing the piled material, and means for placing the packs of piled material on the roll table, substantially as described.

14. The combination with a shear having upper and lower shear blades, and means for relatively actuating said blades, of means positioned at one side of said blades adapted to receive a severed section of material, and a conveyor adjacent said means adapted to convey said section to a desired point, said means being adapted to be moved into one position to form a support for said section while being severed and then to be moved into a different position to effect removal of said section by said conveyor, substantially as described.

15. The combination with a shear having upper and lower shear blades adapted to shear strip material into pieces of any desired length, said pieces being the full width of the material, of means for relatively actuating said blades, of means positioned at one side of said blades for receiving the sheared material, and a conveyor adjacent to but supported independently of said receiving means for effecting removal of the material received thereby, substantially as described.

In testimony whereof I have hereunto set my hand.

RICHARD W. MOSES.